(12) United States Patent
Pisaniello et al.

(10) Patent No.: US 10,040,418 B2
(45) Date of Patent: Aug. 7, 2018

(54) MOTOR VEHICLE SEATBELT RESTRAINT ARRANGEMENT

(71) Applicant: LIFEBELT PTY LIMITED, Dulwich, South Australia (AU)

(72) Inventors: Luigi Pisaniello, Dulwich (AU); Marcel Stephan, Dulwich (AU); Robert Judd, Dulwich (AU); Lino Fusco, Dulwich (AU)

(73) Assignee: LIFEBELT PTY LIMITED, Dulwich (AU)

( * ) Notice: Subject to any disclaimer, the term of this patent is extended or adjusted under 35 U.S.C. 154(b) by 0 days.

(21) Appl. No.: 15/310,166

(22) PCT Filed: May 21, 2015

(86) PCT No.: PCT/AU2015/000296
§ 371 (c)(1),
(2) Date: Nov. 10, 2016

(87) PCT Pub. No.: WO2015/176109
PCT Pub. Date: Nov. 26, 2015

(65) Prior Publication Data
US 2017/0267207 A1 Sep. 21, 2017

(30) Foreign Application Priority Data

May 22, 2014 (AU) ................................ 2014901928

(51) Int. Cl.
*B60R 22/10* (2006.01)
*B60R 22/00* (2006.01)
(Continued)

(52) U.S. Cl.
CPC .......... *B60R 22/105* (2013.01); *B60R 22/001* (2013.01); *B60R 22/024* (2013.01);
(Continued)

(58) Field of Classification Search
CPC combination set(s) only.
See application file for complete search history.

(56) References Cited

U.S. PATENT DOCUMENTS 2,794,653 A * 6/1957 Sullivan .................. B60R 22/02
297/484
5,076,608 A 12/1991 Shimose
(Continued)

FOREIGN PATENT DOCUMENTS

DE 102006053979 B3 * 2/2008 ........... B60R 22/023
EP 2371630 B1 12/2012
(Continued)

*Primary Examiner* — Nicole T Verley
(74) *Attorney, Agent, or Firm* — Renner Kenner Greive Bobak Taylor & Weber

(57) ABSTRACT

A motor vehicle seatbelt restraint arrangement including a continuous seatbelt. When the occupant is seated the seatbelt buckle tongue is drawable across the body to engage the buckle providing firstly a pre-impact configuration of the seatbelt characterized by a lap belt portion resting on the hips or upper legs of the occupant, wherein the lap belt portion is rearward vertically offset relative to an underside belt portion of the continuous seatbelt across the seating surface of the seat, and secondly an impact configuration of the seatbelt characterized by the lap belt portion and the underside belt portion being less rearward vertically offset and substantially vertically aligned one with respect to the other to provide a more vertically aligned loop of the continuous seatbelt around the hips or upper legs of the occupant at impact preventing submarining of the occupant out from the motor vehicle seat during impact.

11 Claims, 10 Drawing Sheets

(51) Int. Cl.
B60R 22/26 (2006.01)
B60R 22/02 (2006.01)
B60R 22/34 (2006.01)

(52) U.S. Cl.
CPC .............. B60R 22/26 (2013.01); B60R 22/34 (2013.01); *B60R 2022/027* (2013.01); *B60R 2022/266* (2013.01)

(56) References Cited

U.S. PATENT DOCUMENTS

| | | | | |
|---|---|---|---|---|
| 5,257,854 A * | 11/1993 | Korneliussen | ......... | B60R 22/02 297/467 |
| 6,592,166 B2 * | 7/2003 | Motozawa | ............... | B60N 2/06 296/68.1 |
| 7,131,668 B2 * | 11/2006 | Go | ....................... | B60N 2/4221 280/808 |
| 7,469,766 B2 | 12/2008 | Guo et al. | | |
| 7,850,205 B2 * | 12/2010 | Pisaniello | ............ | B60R 22/023 280/801.1 |
| 7,954,901 B2 * | 6/2011 | Foye | ...................... | B60R 22/20 280/801.2 |
| 7,988,196 B2 * | 8/2011 | Wang | ................... | B60R 22/023 280/801.1 |
| 8,020,939 B2 * | 9/2011 | Stasiak | ................ | B60N 2/2812 297/466 |
| 8,042,866 B2 * | 10/2011 | Kling | .................... | B60R 22/20 280/801.1 |
| 9,533,646 B2 * | 1/2017 | Schneider | ............ | B60R 21/207 |
| 2004/0070191 A1 | 4/2004 | Higuchi et al. | | |
| 2007/0246927 A1 * | 10/2007 | Okada | .................... | B60R 22/00 280/804 |

FOREIGN PATENT DOCUMENTS

| | | | | |
|---|---|---|---|---|
| WO | WO-2009061232 A1 * | 5/2009 | ........... | B60R 22/023 |
| WO | 2012048363 A1 | 4/2012 | | |

* cited by examiner

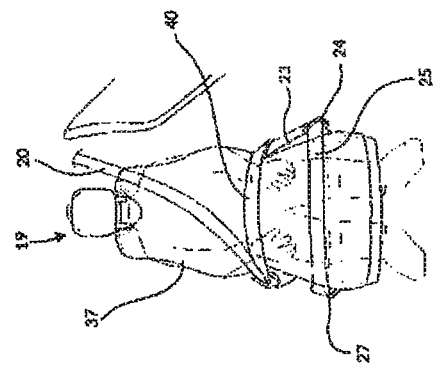
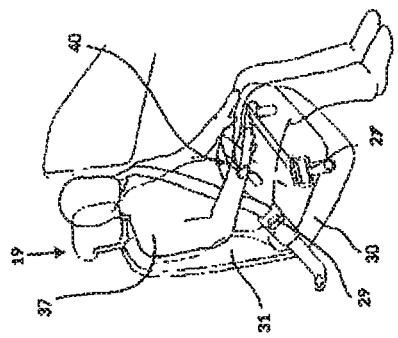
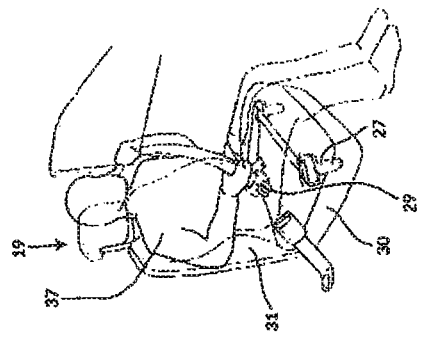
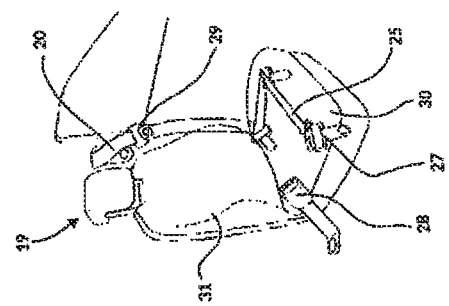

MOTOR VEHICLE SEATBELT RESTRAINT ARRANGEMENT

FIELD OF THE INVENTION

This invention relates to an improved motor vehicle seatbelt restraint arrangement and more particularly to such a seatbelt restraint arrangement that is adapted such that an occupant under restraint by the belt be substantially prevented from submarining out from the seat of the motor vehicle during a motor vehicle impact or crash.

DISCUSSION OF THE PRIOR ART

The applicant previously provided under U.S. Pat. No. 7,850,205 a unique motor vehicle seatbelt restraint arrangement that looked at the problems associated with submarining in the context of motor vehicle impacts and collisions, wherein submarining is characterised by an action when a vehicle occupant slides out from under their seatbelt during a collision and/or related impact.

The conventional three point seatbelt is adapted to restrain the occupant in their seat while spreading the energy of the collision over some of the body's hard parts, such as the chest, pelvis and shoulders. As discussed by the applicant in the earlier granted U.S. Pat. No. 7,850,205, it was found that it was possible for a person wearing these kinds of three point seatbelts to submarine out of the belt in certain circumstances during a collision and/or vehicle impact.

Submarining of the occupant out of the restraint of the belt cause serious, if not life-threatening, injuries to the legs, spine and internal organs.

It is now well recognised children and small adults are particularly prone to submarining out of their seatbelts in a collision and/or vehicle impact.

While the prior art provides for five and six point harness systems to prevent submarining by using one and two crotch straps respectively, these kinds of arrangements are neither comfortable nor convenient for everyday use.

With this problem in mind, the applicant provided what appeared to be an appropriate solution to the conventional three point seatbelt and the more cumbersome five and six point harness systems. The invention disclosed in the applicant's earlier U.S. Pat. No. 7,850,205 was hoped to not only prevent submarining but to provide a seatbelt restraint that would be comfortable to wear and easy to install as part of the motor vehicle seating arrangement.

For the most part the applicant's earlier invention as disclosed in U.S. Pat. No. 7,850,205 involved the use of a continuous belt that was anchored on the upper corner on one side of the seat via a conventional type inertia reel mechanism where the belt extended generally outwards towards the base of the occupant's seat to extend just below the seating surface to extend out the other side of the seat wherein the buckle would be located at the end of the belt such that the buckle tongue, when drawn across to be engaged and fastened in place with the buckle, results in the sash firstly extending over the shoulder and main upper body part of the occupant within the seat and the lap belt generally aligned within a loop configuration with that part of the belt placed in the seat just below the seating surface.

It was expected that the looping arrangement between the lap belt correctly aligned with the under-belt, when the belt restraint was initially fastened, would provide an appropriate configuration of the seatbelt restraint such that upon impact as the occupant applies downward force during impact, as that part of the seatbelt below the seating surface is continuous with the lap belt portion of the belt, this would then result in a tightening of the loop configuration of the belt wrapping around the upper legs of the occupant being restrained in the seat, thereby preventing submarining.

It has been hitherto now recognised by the applicant that while being able to create a loop configuration wherein for the most part the lap belt portion across the upper legs and/or thighs should be aligned with the belt section located in the seat base just below the seating surface, the problem was that if the aligned loop configuration between the lap belt portion and the underside seatbelt portion was configured at the time of initially fastening the seatbelt restraint when the occupant positions themselves in the seat, i.e. a pre-impact position, at the time of impact the occupant's momentarily immediate repositioning resulted in the aligned loop no longer having the lap belt portion and the under belt portion vertically aligned one with respect to the other in order to create the requisite loop that would tension and wrap around the upper legs of the occupant on impact.

Accordingly, there remains a requirement to provide for an improved seatbelt restraint arrangement that will be adapted to provide the appropriate configuration of the loop between the lap belt portion and the under belt portion under the seating surface of the seat at the time of impact.

Still further this invention, as will shortly be described and defined, solves other problems associated with conventional motor vehicle seatbelt arrangements including those that deal with the safety concerns and hazards for small occupant(s) in the vehicle.

Accordingly an object of this invention is to provide a motor vehicle seatbelt restraint arrangement that will be effective over a complete range of sizes of adult occupants, whether male or female, as well as preventing submarining in those individuals having a body structure size in the range of a 10 year old.

Further objects and advantages of the invention will become apparent from a complete reading of this specification.

SUMMARY OF THE INVENTION

In one form of the invention there is provided a motor vehicle seatbelt restraint arrangement, said arrangement including; a continuous seatbelt, said continuous seatbelt at an upper end anchored at the back, rearward and/or at the top of a motor vehicle seat to which said motor vehicle seat an occupant would be restrainable therein; said continuous seatbelt extendable longitudinally down a first side of the motor vehicle seat for engagement with a first anchored guide at or towards the base of the motor vehicle seat, said first anchored guide arranged to allow the continuous seatbelt to be positionable on or under a seating surface of the motor vehicle seat to provide for an underside belt portion, wherein the continuous seatbelt at the end of the underside belt portion is anchored at a continuous seatbelt anchor point to a second side of the motor vehicle seat; a seatbelt buckle mountable on the second side of the motor vehicle seat, wherein the seatbelt buckle is mounted rearward of the continuous seatbelt anchored point on the second side of the motor vehicle seat; a seatbelt buckle tongue, said seatbelt buckle tongue slidably engagable with the continuous belt such that when the occupant is seated in the motor vehicle seat the seatbelt buckle tongue is drawable across the body of the occupant fastenable into the seatbelt buckle providing; firstly, a pre-impact configuration of the seatbelt restraint arrangement, pre-impact configuration providing a loop arrangement of the continuous seatbelt wherein the loop arrangement for the pre-impact configuration includes a lap belt portion of the continuous seatbelt that rests on the hips or upper legs of the occupant rearward vertically offset relative to the underside belt portion; and secondly, an impact configuration of the seatbelt restraint arrangement, wherein the loop arrangement of the continuous seatbelt in the impact configuration is characterised by a reduction in the rearward vertically offset between the lap belt portion and the underside belt portion of the continuous seatbelt to provide a substantially vertically aligned lap belt portion and the underside belt portion for the loop arrangement around the hips or upper legs of the occupant at the moment of impact thereby preventing submarining of the occupant out from the motor vehicle seat during impact.

In preference the first anchored guide is further adapted to laterally extend the continuous seatbelt to a forwardly mounted second anchored guide on the first side of the motor vehicle seat, wherein the second anchored guide allows the continuous seat belt access there from across either above or under the seating surface of the motor vehicle seat to provide for an underside belt portion for the occupant, wherein the continuous seatbelt at the end of the underside belt portion is anchored at the continuous seatbelt anchor point on the second side of the motor vehicle seat.

In preference the arrangement further including a clip fastenable to said underside belt portion, said clip accessible to the occupant of the motor vehicle seat.

In preference when the lap belt portion of the continuous seatbelt is established by the seatbelt buckle tongue being drawn across the body of the occupant and fastened into the seatbelt buckle so that the lap belt portion of the continuous seatbelt rests on the hips or upper legs of the occupant said lap belt portion is fastenable to the clip so as to provide a pair of loops about each upper leg of the occupant.

In preference the arrangement further includes a second belt.

In preference the second belt is anchored on the first side of the motor vehicle seat and configured to extend across the seating surface of the motor vehicle seat to provide for a second underside belt portion.

In preference the second underside belt portion is configured substantially parallel and rearward of the underside belt portion of the continuous seatbelt.

In preference the second underside belt portion is mounted to a fixed anchor on the first side of the motor vehicle seat and to a guide anchor on the second side of the motor vehicle.

In preference the guide anchor is configured to guide the second belt into a fixed engagement with the seatbelt buckle mountable on the second side of the motor vehicle seat.

In preference the second underside belt portion extends substantially diagonally across the seating surface of the motor vehicle seat and wherein the underside belt portion of the continuous seatbelt extends substantially diagonally across the seating surface of the motor vehicle seat.

In preference the second underside belt portion is anchored at one end to the seatbelt buckle on the second side of the motor vehicle seat and wherein the second underside belt portion is guided by a fixed anchor guide on the first side of the motor vehicle seat to extend back across the seating surface of the motor vehicle seat to be anchored at the other end of said second underside belt portion to provide for a third underside belt portion.

In preference the occupant has a body structure that includes the body structure of a 10 year old child.

Advantageously by recognising that in order to have the lap belt portion generally slightly rearward relative to the belt portion just below the seating surface in the pre-impact position, which is achieved by having the buckle mounted slightly rearward of the portion of the belt running across and below the seating surface of the seat provides better prevention of submarining for occupants of all body structure size.

Further preferred aspects of this part of the invention will be discussed when referencing preferred embodiments as the illustrationed in the figures to be described shortly.

In an alternative form of the invention there is a motor vehicle seatbelt restraint arrangement, said arrangement including a flexible belt extending below the seating surface of a seat under the restraint of said belt restraint arrangement, a clip fastenable to said belt below the seating surface of said seat, said clip accessible to an occupant of the seat such that when a tongue of a buckle draws a belt across the body of the occupant to engage an anchored buckle to establish a lap belt portion of the belt across the hips of the occupant, said lap belt portion is fastenable to the clip as to provide a pair of loops about each upper leg of the occupant thereby preventing submarining including for those of a body structure akin to a 10 year old or thereabouts.

In preference the continuous seatbelt is anchored to the vehicle via an inertia reel mechanism.

Further preferred embodiments of this invention will be discussed with reference to the accompanying illustrations.

While the preferred embodiments described below and referenced in the illustrations show the underside belt portion(s) of the continuous seatbelt under the seating surface of the vehicle seat, the underside belt portion(s) can also be positioned on and/or above the seating surface of the vehicle seat.

BRIEF DESCRIPTION OF THE DRAWINGS

FIGS. 4a, 4b, 4c and 4d are schematic representations of the initial seatbelt fastening and pre-impact configuration of the vehicle seatbelt restraint arrangement in a preferred embodiment of the invention.

DETAILED DESCRIPTION OF THE DRAWINGS

Figure 1:
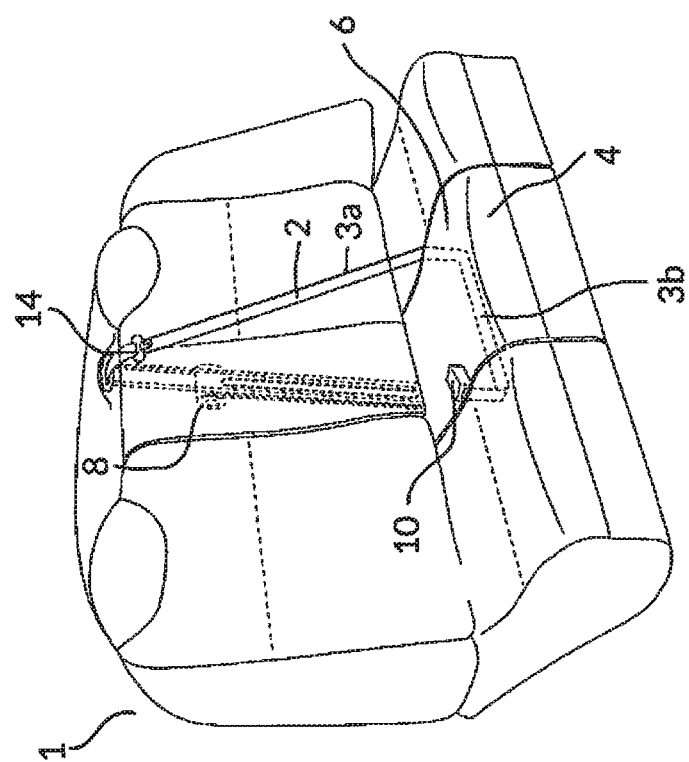
FIG. 1 is a front perspective view of a PRIOR ART vehicle seatbelt restraint arrangement.

FIG. 1 shows a representation of a prior art seatbelt restraint arrangement shown generally as (1) wherein the seatbelt (2) is anchored (8) on one side of the seat (4) and wherein a lap portion (3a) of the seatbelt (2) extends down and out slightly so as to allow the seatbelt (2) to move in below the seating surface (6), with that underside portion of the seatbelt (2) below the seating surface (6) shown as (3b). The seatbelt terminates on the other side of the seat (4) with a buckle (10) which is adapted to receive the buckle tongue (14).

When an occupant (not shown) is in the seat (4) the occupant is able to draw the buckle tongue (14) across to engage in the buckle portion (10) so that for the most part the seatbelt (2) is configured so that the lap portion (3a) and the underside portion (3b) are aligned and overlapped to provide a loop about the upper legs of the occupant.

As introduced above it was found that these kinds of prior art seatbelt restraint arrangements upon impact saw the lap portion (3a) of the seatbelt (2) no longer in an appropriate overlapping vertically alignment with the underside (3b) portion to provide the requisite loop preventing submarining, albeit from a pre-impact position the lap portion (3a) and the underside portion (3b) of the seatbelt (2) were aligned when the occupant first buckled the seatbelt (2).

Figure 2:
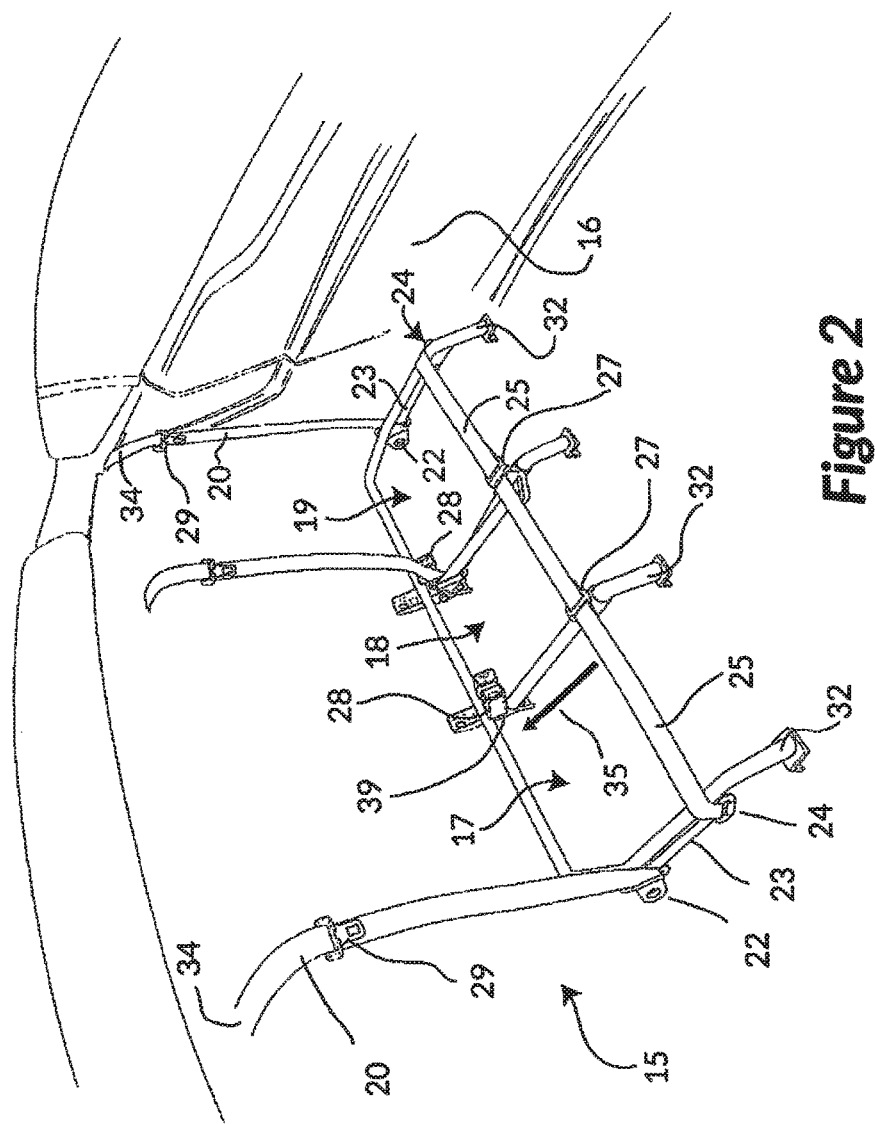
FIG. 2 is a perspective view of a vehicle seatbelt restraint arrangement in a preferred embodiment of the invention.
Figure 3:
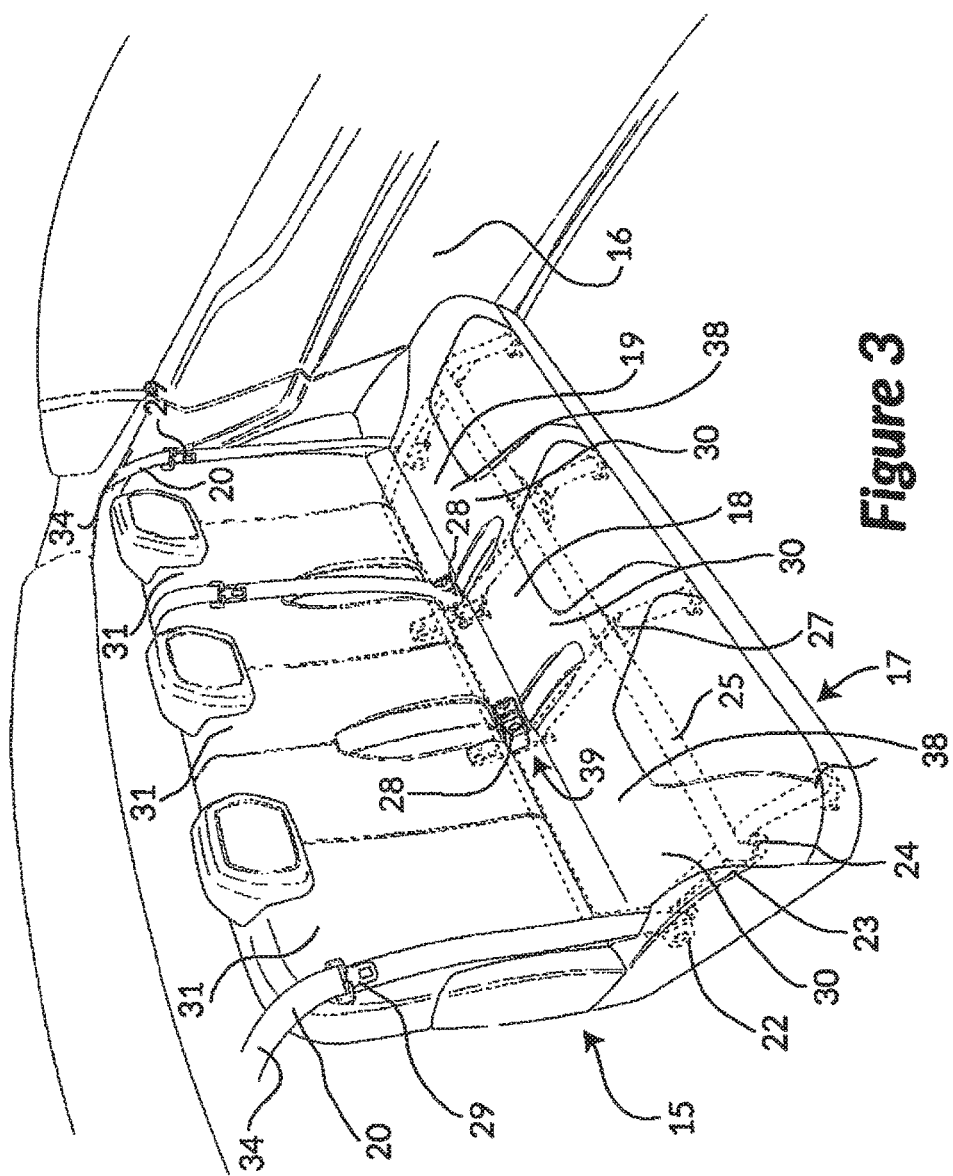
FIG. 3 is a similar perspective view as shown in FIG. 2 further including the base support and cushions and the upper back support and cushions to the seats of the vehicle.

FIGS. 2 and 3 illustrate a preferred vehicle seatbelt restraint arrangement of this invention, shown generally as (15) installed within a vehicle (16).

FIG. 3 shows the base support and cushions (30) and the upper back support and cushions (31) for the respective seats (17), (18) and (19) formed as part of the seating framework (32) of the vehicle (16). For clarity reasons the base support and cushions (30) and the upper back support and cushions (31) for the respective seats (17), (18) and (19) are not shown in FIG. 2.

Referring to seats (17) and (19) wherein while not referenced the same features and function applies to seats (18).

Seats (17) and (19) each include a continuous seatbelt (20) mounted to the vehicle (16) towards an upper end (34) of the seatbelt (20) in behind or at the back of the each seat (17) and (19).

The seatbelt (20) on one side of the seats (17), (19) generally extends down vertically passing through an anchored D-ring (22) extending laterally along the base side of the seat (23) to engage a further D-ring (24) wherein the portion of the belt (25) is positioned within the seat just below the seating surface, shown as (38) in FIG. 3, wherein the seatbelt (20) is then mounted on the opposing side of the seats (17), (19) by way of the anchor point (27).

In the preferred embodiment shown in FIGS. 2 and 3 the buckle (28) is anchored rearward, shown by way of arrow (35) in FIG. 2 to a vehicle mount (39). Therefore the underside belt portion (25) which crosses just under the seating surface (38) of the cushion (30) for seats (17), (19) unlike the prior art discussed above, the embodiment of this invention does not have the seatbelt (20) terminating with the buckle (28).

Importantly as illustrated in FIGS. 2 and 3 for this preferred embodiment of the invention, the seatbelt (20) has the underside belt portion (25) which crosses just under the seating surface (38) of the cushion (30) for seats (17), (19) terminating at the anchor point (27) with the buckle (28) now anchored at (39) which is significantly rearward of the anchor point (27).

As best seen in FIGS. 4a, 4b, 4c and 4d, when the occupant (37) is in the seat (19) the occupant (37) is able to take the buckle tongue (29) across the body to engage the buckle (28) thereby providing an initial pre-impact configuration of the seat belt restraint best seen in FIGS. 4c and 4d wherein the seatbelt when the buckle (28) and buckle tongue (29) are engaged provides for the lap belt portion (40).

This lap belt portion (40) configured in the pre-impact position for the vehicle is rearward relative to the underside belt portion (25).

Unlike the prior art discussed above, in the pre-impact position of the seatbelt restraint arrangement of this preferred embodiment there is no vertically aligned overlap between the lap (40) and the underside (25) belt portions of the seatbelt (20) when the seatbelt (20) is initially fastened by the occupant. Accordingly for the "pre-impact position" there is no created loop where the lap and the underside portions of the seatbelt are substantially vertically overlap in a loop about the upper legs of the occupant.

Figure 5:
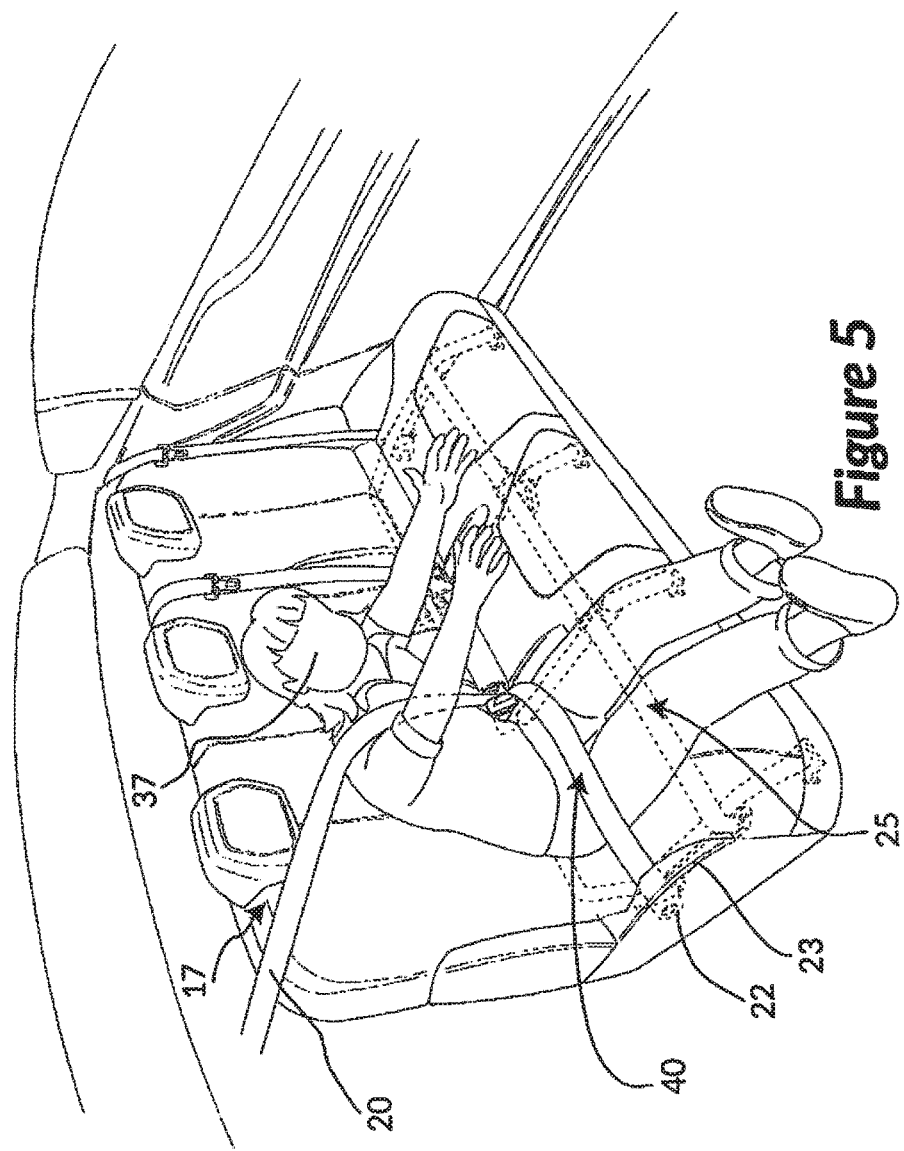
FIG. 5 schematic representation of an impact configuration of the vehicle seatbelt restraint arrangement in a preferred embodiment of the invention.

As best seen in FIG. 5 during an impact the occupant will vertically push down into the seat and as the underside of the belt (25) remains in continuous contact with the same lap belt portion (40) there is a general adjusted movement of the lap belt portion (40) of the seatbelt (20) so that a more vertically aligned loop configuration between the lap belt portion (40) and the underside belt portion (25) of the belt is established during impact thereby preventing submarining.

As the pre-impact configuration shown in FIGS. 4c and 4d has the lap belt portion (40) rearward vertically offset relative to the underside belt portion (25), the loop arrangement during impact has the opportunity of vertically re-aligning so that at impact the vertically offset is substantially reduced and/or eliminated between the lap belt portion (40) and the underside belt portion (25) so that at impact the loop configuration has the lap belt portion (40) and underside belt portion (25) more vertically aligned around the hips or upper legs of the occupant at the moment of impact thereby preventing submarining of the occupant out from the motor vehicle seat during impact.

Figure 6:
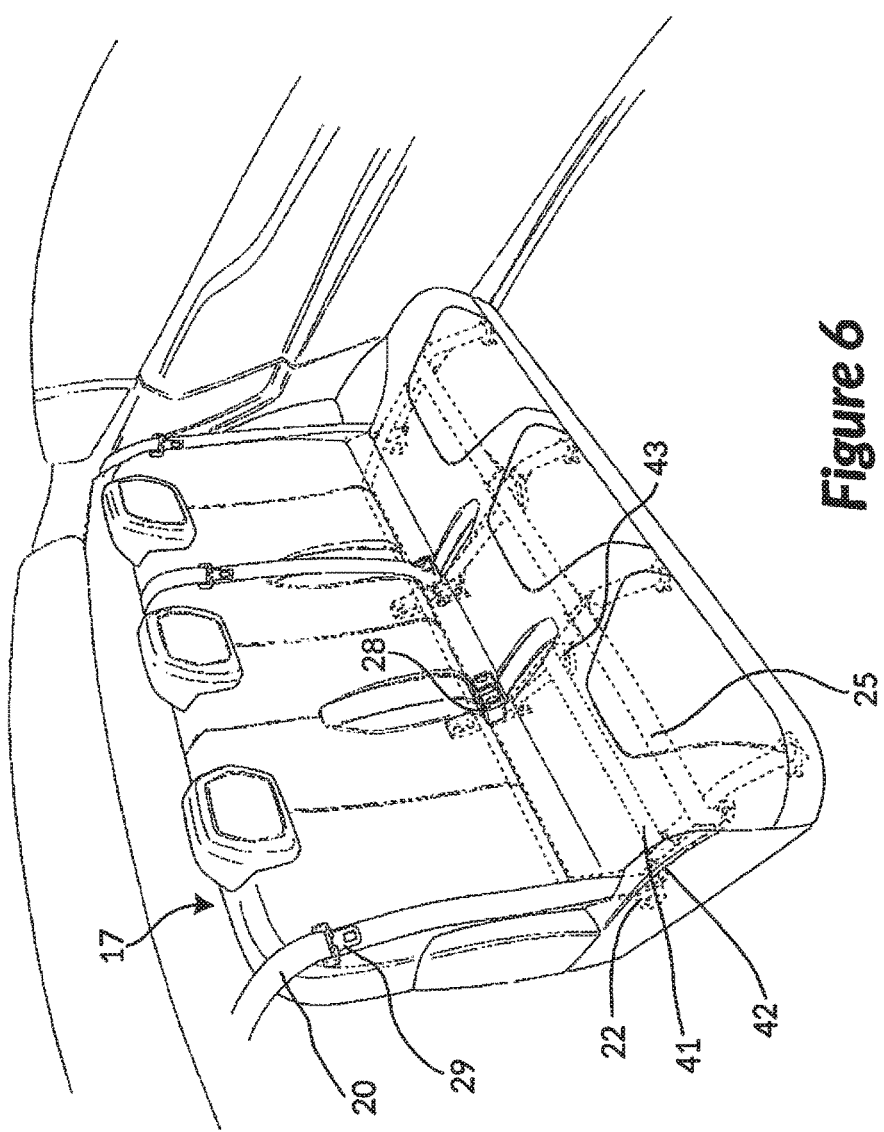
FIG. 6 is a perspective view of a vehicle seatbelt restraint arrangement in a further preferred embodiment of the invention.

FIG. 6 shows a further embodiment of the invention wherein a second underside belt (41) is included as part of the arrangement (15).

The second underside belt (41) it is mounted to a fixed anchor shown as (42) on one side of the seat (17). The second underside belt (41) extends, just like the underside belt portion (25) of the seatbelt (20) just below the seating surface, however in the embodiment shown in FIG. 6 the second underside belt (41) engages a separate slip-ring (43) on the opposing side of the seat (17) to the fixed anchor shown as (42), so that the continuous length of second underside belt (41) can then engage the mounted buckle (28).

In this embodiment shown for FIG. 6 the mounted buckle (28) still serves also with the functionality as described in FIGS. 2-5 wherein the buckle tongue (29) of the continuous seatbelt (20) can be drawn across the occupant and fastened within the buckle (28) to establish the lap belt portion (40) configured in the pre-impact position for the vehicle rearward relative to the underside belt portion (25).

Figure 7:
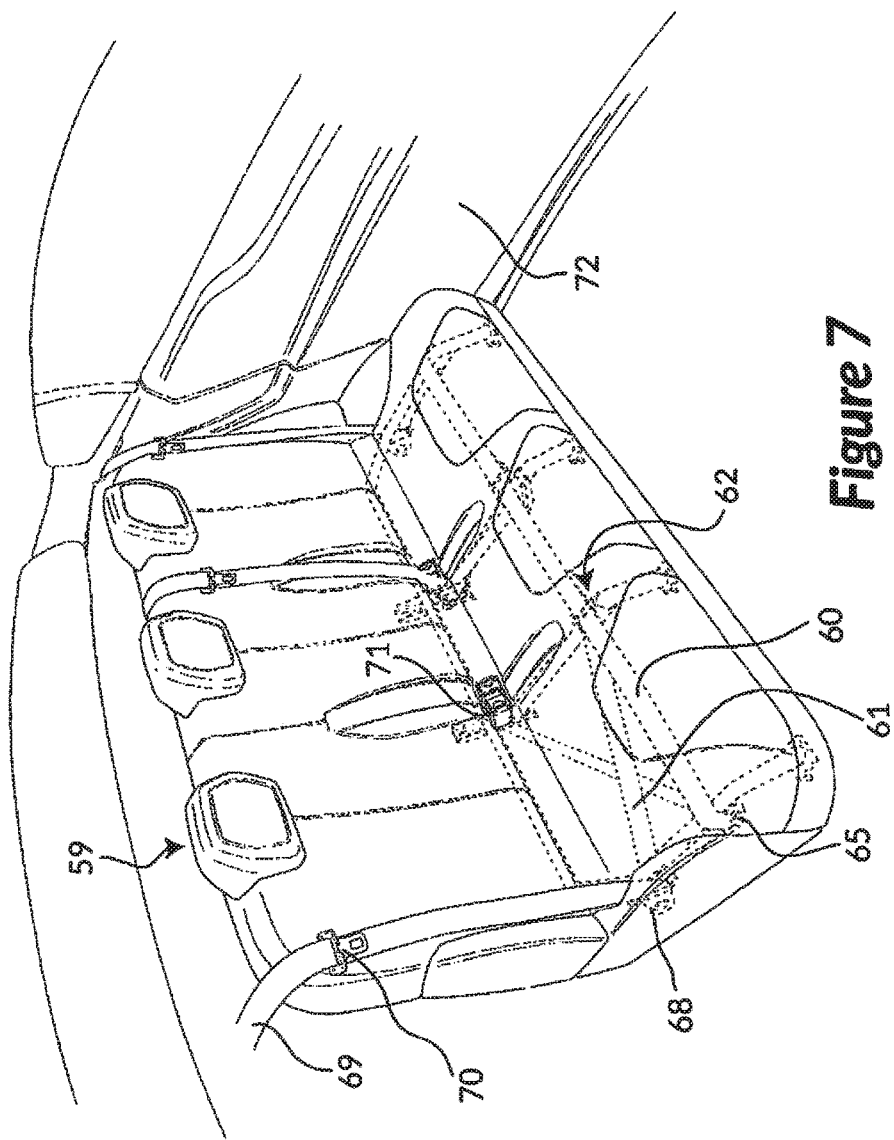
FIG. 7 is a perspective view of a vehicle seatbelt restraint arrangement in a still further preferred embodiment of the invention.

FIG. 7 provides a further embodiment having a first belt (60) and a second belt (60) wherein each belts (60) and (61) shares the same fixed anchor (62) on one side of the seat (59).

The first belt (60) extends below the seating surface (not shown) of the seat (59) continuously wrapping around a slip-ring (65) diagonally extending rearwardly to an anchored or mounted end buckle (71). Preferably the first belt (60) terminates in the buckle (71) and the buckle is mounted to a slip ring anchor (not shown).

The second belt (61) diagonally rearwardly across the seat (59) from the fixed anchor mount (62) to engage slip-ring anchor (68) to continuously extend substantially vertically upwards along the seat (59) where it is mounted to the motor vehicle (72) at an upper end shown generally as (69).

The buckle tongue (70) slidably engageable along the belt (61) and is adapted to pass across and engage the buckle (71).

Figure 8:
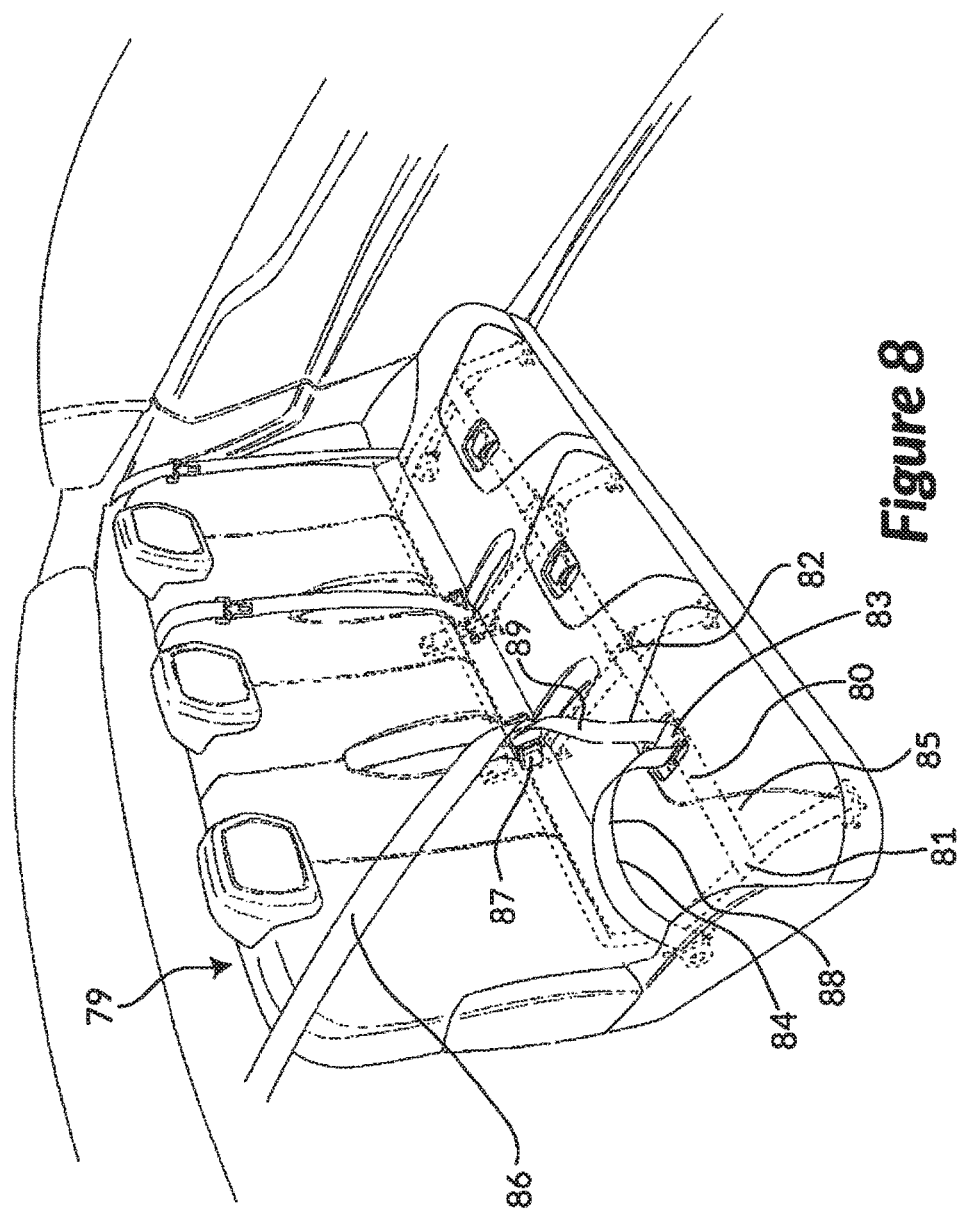
FIG. 8 is a perspective view of a vehicle seatbelt restraint arrangement in a further preferred embodiment of the invention.

FIG. 8 shows a further preferred embodiment related to the small occupant's safety enhancement feature wherein the underside belt (80) is mounted on opposing sides of the seat (79) at anchor points (81) and (82), wherein a clip (83) is fastenable thereon the underside belt (80).

Figure 9:
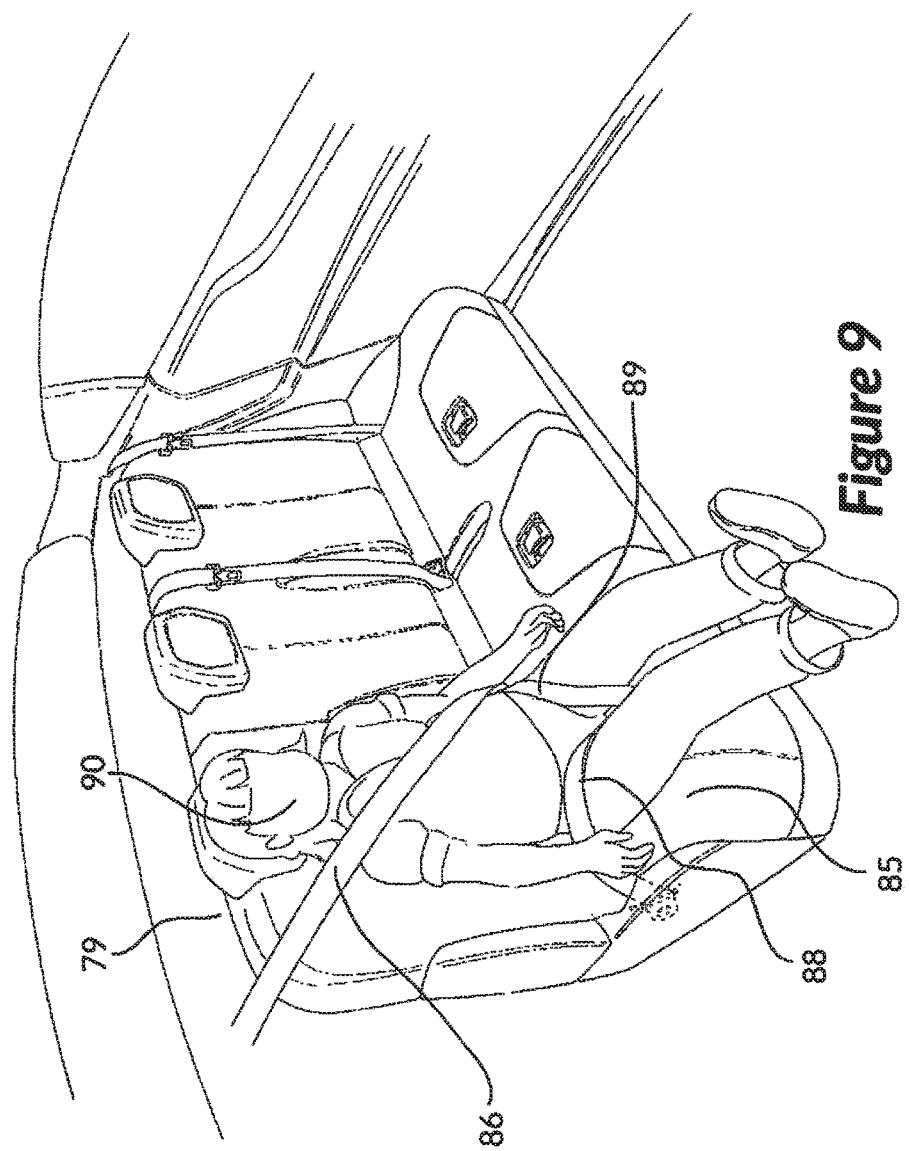
FIG. 9 is a similar perspective view as shown in FIG. 8 further including an occupant restrained in the seatbelt in a pre-impact position.

The clip (83) is accessible from the seat base (85) by the occupant (90) as best seen in FIG. 9, when the belt (86) has been engaged with the buckle (87), the lap belt portion (84) of the seatbelt (86) because of the extra engagement with the clip (83) provides for the two loops (88) and (89) positional about the upper legs of the occupant (90), again as best seen in FIG. 9.

It is to be appreciated the other referred to embodiments illustrated in FIGS. 1-7 and FIG. 10, can also include a clip which is fastened to the underside portion of the belt just below the seating surface wherein this clip is also accessible to the occupant, which for example could be a child with a body structure comparative to a 10 year old or thereabouts.

The introduction of the clip and its accessibility to the occupant positioned on the seat means that when the belt is drawn across the body of the user and the buckle tongue engages and fastens into the buckle, the lap portion of the belt can then be fastened to the clip so as to provide two deliberate separate loops each about the upper legs of the occupant to enhance the prevention of submarining during impact.

Generally for the preferred embodiment using the clip feature, initial engagement of the belt restraint would include first of all clicking the buckle tongue into the buckle and then the lap portion of the belt engaging the clip in order to establish the two loops about the upper leg of the occupant, in preferred embodiments the clip would be in communication with the buckle such that when the buckle tongue is released from the buckle this then simultaneously results in the release of the lap portion of the belt also disengaging the clip so that disengagement and/or release of the belt restraint from the occupant is completed in a single action.

Figure 10:
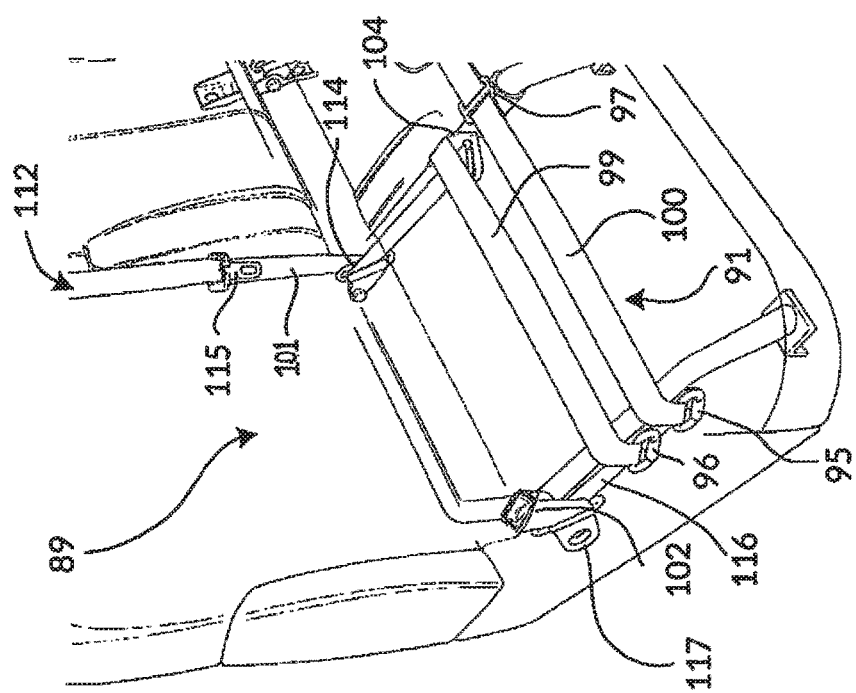
FIG. 10 is a perspective view of a vehicle seatbelt restraint arrangement in a further preferred embodiment of the invention.

FIG. 10 shows a further preferred embodiment of the invention, this time there are two underbelts (99) and (100) established by the mounting of a continuous belt (91) at the anchor (97) passing the belt (91) initially through the D-ring (95) slightly laterally extending the belt (91) rearwardly to D-ring (96) and then bringing the belt (99) back across to be mounted at (104) thereby establishing two underbelts (99) and (100).

Belt (101) is mounted to the vehicle towards an upper end (112) of the belt (101), and generally towards the base of the seat (89) shown by way of anchor point (114).

The buckle tongue (115) is slidable along the belt (101).

The belt (101) is adapted to be drawn across the occupant (not shown) so that the buckle tongue (115) can engage in the receiving buckle (102) mounted on the opposite side of the seat (89) at anchor point (117).

A lateral belt portion (116) can also connect and bring together the underside belts (99) and (100) via the two D rings (95) and (96) with buckle (102) via the anchor point (117).

The invention claimed is:

1. A motor vehicle seatbelt restraint arrangement, said arrangement including;
   a continuous seatbelt, said continuous seatbelt at an upper end anchored at the back, rearward and/or at the top of a motor vehicle seat to which said motor vehicle seat an occupant would be restrainable therein;
   said continuous seatbelt extendable longitudinally down a first side of the motor vehicle seat for engagement with a first anchored guide at or towards the base of the motor vehicle seat, said first anchored guide arranged to allow the continuous seatbelt to be positionable on or under a seating surface of the motor vehicle seat to provide for an underside belt portion, wherein the continuous seatbelt at the end of the underside belt portion is anchored at a continuous seatbelt anchor point to a second side of the motor vehicle seat;
   a seatbelt buckle mountable on the second side of the motor vehicle seat, wherein the seatbelt buckle is mounted rearward of the continuous seatbelt anchored point on the second side of the motor vehicle seat;
   a seatbelt buckle tongue, said seatbelt buckle tongue slidably engagable with the continuous belt such that when the occupant is seated in the motor vehicle seat the seatbelt buckle tongue is drawable across the body of the occupant fastenable into the seatbelt buckle providing;
   firstly, a pre-impact configuration of the seatbelt restraint arrangement, pre-impact configuration providing a loop arrangement of the continuous seatbelt wherein the loop arrangement for the pre-impact configuration includes a lap belt portion of the continuous seatbelt that rests on the hips or upper legs of the occupant rearward vertically offset relative to the underside belt portion;
   secondly, an impact configuration of the seatbelt restraint arrangement, wherein the loop arrangement of the continuous seatbelt in the impact configuration is characterised by a reduction in the rearward vertically offset between the lap belt portion and the underside belt portion of the continuous seatbelt to provide a substantially vertically aligned lap belt portion and the underside belt portion for the loop arrangement around the hips or upper legs of the occupant at the moment of impact thereby preventing submarining of the occupant out from the motor vehicle seat during impact; and
   a second belt anchored on the first side of the motor vehicle seat and configured to extend across the seating surface of the motor vehicle seat to provide for a second underside belt portion.

2. A motor vehicle seatbelt restraint arrangement of claim 1 wherein the first anchored guide is further adapted to laterally extend the continuous seatbelt to a forwardly mounted second anchored guide on the first side of the motor vehicle seat, wherein the second anchored guide allows the continuous seat belt access there from across either above or under the seating surface of the motor vehicle seat to provide for an underside belt portion for the occupant, wherein the continuous seatbelt at the end of the underside belt portion is anchored at the continuous seatbelt anchor point on the second side of the motor vehicle seat.

3. The motor vehicle seatbelt restraint arrangement of claim 1 further including a clip fastenable to said underside belt portion, said clip accessible to the occupant of the motor vehicle seat.

4. The motor vehicle seatbelt restraint arrangement of claim 3 wherein when the lap belt portion of the continuous seatbelt is established by the seatbelt buckle tongue being drawn across the body of the occupant and fastened into the seatbelt buckle so that the lap belt portion of the continuous seatbelt rests on the hips or upper legs of the occupant said lap belt portion is fastenable to the clip so as to provide a pair of loops about each upper leg of the occupant.

5. The motor vehicle seatbelt restraint arrangement of claim 1 wherein the second underside belt portion is configured substantially parallel and rearward of the underside belt portion of the continuous seatbelt.

6. The motor vehicle seatbelt restraint arrangement of claim 1 wherein the second underside belt portion is mounted to a fixed anchor on the first side of the motor vehicle seat and to a guide anchor on the second side of the motor vehicle.

7. The motor vehicle seatbelt restraint arrangement of claim 6 wherein the guide anchor is configured to guide the second belt into a fixed engagement with the seatbelt buckle mountable on the second side of the motor vehicle seat.

8. The motor vehicle seatbelt restraint arrangement of claim 1 wherein the second underside belt portion extends substantially diagonally across the seating surface of the motor vehicle seat and wherein the underside belt portion of the continuous seatbelt extends substantially diagonally across the seating surface of the motor vehicle seat.

9. The motor vehicle seatbelt restraint arrangement of claim 8 wherein the second underside belt portion is anchored at one end to the seatbelt buckle on the second side of the motor vehicle seat and wherein the second underside belt portion is guided by a fixed anchor guide on the first side of the motor vehicle seat to extend back across the seating surface of the motor vehicle seat to be anchored at the other end of said second underside belt portion to provide for a third underside belt portion.

10. The motor vehicle seatbelt restraint arrangement of claim 1 wherein the occupant has a body structure that includes the body structure of a 10 year old child.

11. The motor vehicle seatbelt restraint arrangement of claim 1 wherein the continuous seatbelt is anchored to the vehicle via an inertia reel mechanism.

\* \* \* \* \*